June 5, 1923.
H. HOWARD ET AL
1,457,436
PROCESS OF MAKING METAL SULPHIDES
Filed Dec. 29, 1921
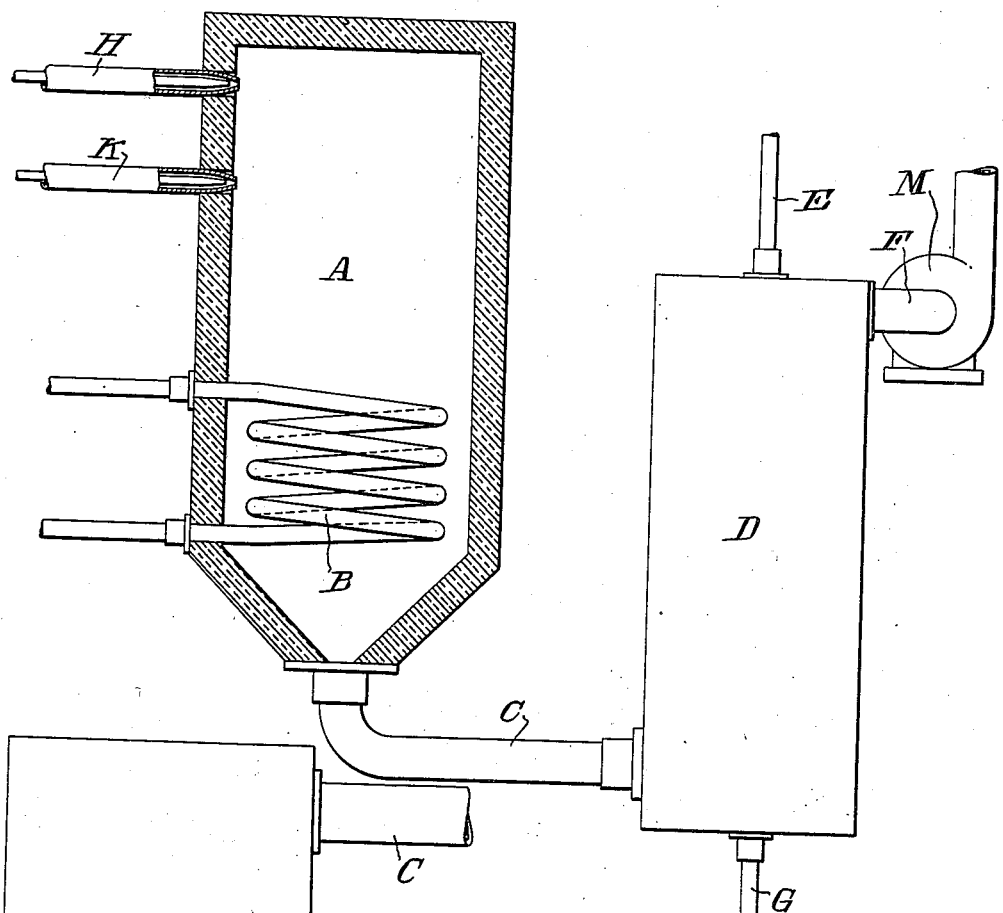
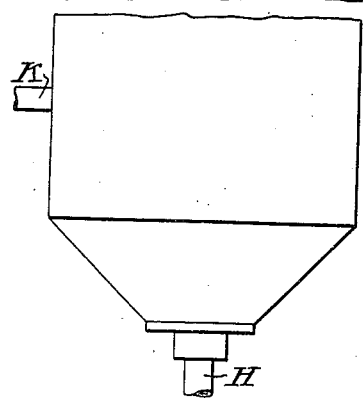
Inventors:
Henry Howard,
Earl B. Alvord,
by Byrnes, Townsend & Brickenstein,
Attorneys.

Patented June 5, 1923.

1,457,436

UNITED STATES PATENT OFFICE.

HENRY HOWARD AND EARL BURNARD ALVORD, OF CLEVELAND, OHIO, ASSIGNORS TO THE GRASSELLI CHEMICAL COMPANY, OF CLEVELAND, OHIO, A CORPORATION OF OHIO.

PROCESS OF MAKING METAL SULPHIDES.

Application filed December 29, 1921. Serial No. 525,713.

*To all whom it may concern:*

Be it known that we, (1) HENRY HOWARD and (2) EARL BURNARD ALVORD, citizens of the United States, residing at Cleveland, in the county of Cuyahoga and State of Ohio, have invented certain new and useful Improvements in Processes of Making Metal Sulphides, of which the following is a specification.

This invention relates to a process of making metal sulphides by the reduction of the sulfates according to the following well known reaction $$MSO_4 + 4C = MS + 4CO.$$

We have found that if the metal sulfate is very finely divided and brought into intimate contact with the reducing agent the reaction may be made to take place with great rapidity and efficiency. Our invention, therefore, consists in reducing a metal sulfate to the sulphide by means of and while it is suspended in a reducing atmosphere.

The process is especially well suited for the production of the sulphides of sodium and barium although, as will be apparent, the process may be used for the manufacture of other metal sulphides.

For convenience the process will be described in detail with reference to the manufacture of barium sulphide from barium sulfate.

Barium sulphide is commonly produced by mixing ground barytes with fine coal, introducing the mixture into a rotary kiln, and roasting the mixture by means of a fire generally produced by burning bituminous coal. The charge is held in the furnace for two or three hours and is then transferred, while hot, to leaching tanks in which the soluble barium sulphide is leached out with water. In this process the barytes is generally not very finely ground. Material which will pass a 40 mesh screen would probably represent the average, although some plants operate with more coarsely ground material.

In our process the barytes or other metal sulfate is very finely ground so that it will all pass through a 200 mesh screen or finer and suspended in a reducing atmosphere at a sufficient temperature to cause the reaction forming the metal sulphide to take place and the so formed metal sulphide is recovered from the gases.

The process may be carried out in several different ways. For instance, the finely pulverized metal sulfate may be mixed with pulverized coal or other solid carbonaceous material and the mixture blown into a combustion chamber by means of air and ignited and burned in the same way as powdered coal is burned for heating purposes in, for instance, the manufacture of Portland cement. The reaction forming the metal sulphide takes place almost instantaneously and the metal sulphide may be separated from the gases leaving the combustion chamber by any well known method, such as by passing the gases through electrostatic precipitators or through cyclone dust separators, or bag filters, or by bringing the gases into contact with a scrubbing liquid.

Instead of mixing the metal sulphate with powdered coal or other carbonaceous material as described above the finely pulverized sulfate may be blown into a reaction chamber along with a combustible gas mixture which burns within the chamber producing the necessary heat and reducing conditions for reducing sulfate to the sulphide. Or the finely pulverized sulfate may be blown into a combustion chamber into the flame or hot reducing gases produced by burning liquid fuel such as oil.

It will also be apparent that the use of combinations of solid, liquid, and gaseous fuel may be employed for producing the hot reducing atmosphere in which the metal sulfate is suspended and that the finely pulverized sulfate may be supplied with all or with a part or independently of the fuel.

Since the gases leaving the reaction chamber and carrying finely divided metal sulphide are at a high temperature it is desirable in the recovery of the metal sulphide from the gases to employ some method which will recover the sensible heat of the gases, and when the gases after cooling and separation of the metal sulphide contain sufficient carbon monoxid they may be burned and the heat utilized as desired.

The reaction may be carried out in different forms of apparatus. The apparatus comprises a combustion chamber and means for separating the metal sulphide from the gas in or passing from the combustion chamber. Ordinarily a heat exchange apparatus is interposed between the means for separating metal sulphide from the gases and the combustion chamber.

The combustion chamber may be either horizontal or vertical and in case a vertical combustion chamber is employed the gaseous atmosphere in which the reaction takes place may be made to flow upwardly or downwardly.

In the accompanying drawings we have illustrated apparatus suitable for carrying out the process. It is to be understood, however, that the arrangements illustrated are by no means the only ones which could be used.

Fig. 1 is a vertical section of an arrangement of apparatus suitable for carrying out the process.

Fig. 2 is a vertical section of the combustion chamber of a modified arrangement of apparatus.

Referring to Fig. 1, A is a vertical combustion chamber in which the reduction of metal sulfate suspended in the hot reducing atmosphere takes place. The gases carrying suspended finely divided metal sulphide pass downwardly through a heat exchanger B located in the lower end of chamber A in which the gases are cooled and the sensible heat of the gases is used for heating purposes. As illustrated, the heat exchanger B is a coil of pipe. The cooled gases pass from the heat exchanger B through the conical bottom of chamber A and flue C into the bottom of a tower scrubber D which is supplied with water through a pipe E. The scrubbed gases leave the scrubber through a pipe F and blower M and may be discharged into the atmosphere or, since they usually contain sufficient carbon monoxide to burn, they may be conveyed to a furnace and used for heating purposes. The solution formed in the scrubber tower D is discharged therefrom through discharge pipe G. H is a burner projecting into the combustion chamber at or near its upper end and K is a second burner projecting in to the combustion chamber at a point at a substantial distance below the upper end of the combustion chamber.

In carrying out our process in the apparatus illustrated in Fig. 1 a fuel such as powdered coke, coal dust, fuel gas or fuel oil is supplied to the burner H and burned in the upper end of the combustion chamber producing a downwardly flowing, reducing flame. Finely pulverized barytes is blown into the combustion chamber through the pipe K where it mingles with and is suspended in the downflowing curent of burning gases produced by burner H. The pulverized barytes may be blown into the furnace by means of air or a combustible gas but preferably the pulverized barytes is mixed with 20 or 30 per cent of its weight of powdered coal and projected into the combustion chamber through the burner K by means of a blast of air. The powdered coal and pulverized barytes mixes with the flame from burner H, and the resulting flame passes downwardly through the combustion chamber wherein the reduction of the barium sulfate to sulphide takes place. The hot gases then pass through the heat exchanger B and upwardly through the scrubber D.

The liquid leaving the scrubber D through pipe G is an aqueous solution of barium sulphide.

Instead of supplying fuel through the burner H and barytes through the burner K as described above, both fuel and barytes may be supplied to both burners or one of the burners, preferably burner K, may be omitted or closed and all of the fuel with the pulverized barytes supplied to the combustion chamber through the burner H.

The apparatus illustrated in Fig. 2 comprises the same units as the apparatus illustrated in Fig. 1 and differs therefrom only in that the burner H enters the vertex of the conical bottom of the combustion chamber and burner K enters the combustion chamber at a point above burner H. The gases are taken from the chamber through pipe C at the upper end and are then led to the heat regenerating and sulphide recovering means. The burners H and K are operated in the manner described in connection with Fig. 1 but as will be apparent the gaseous reducing atmosphere in which the metal sulfate is suspended flows upwardly instead of downwardly as described in connection with Fig. 1. The advantage of this form of apparatus is that the gas stream exerts a lifting force on the suspended particles so that they are suspended in the reducing gas for a longer period than when the gas flows downwardly or if a longer period for reaction is not desired the combustion chamber of Fig. 2 may be made shorter than the combustion chamber of Fig. 1 and the same period of contact between the metal sulfate and the reducing atmosphere in the combustion chamber obtained.

A definite temperature or range of temperatures within which the process may be carried out cannot be stated. Each metal sulfate has its best temperature for decomposition, the minimum temperature for barium sulfate being about 950° C. while the temperature at which the reduction of sodium sulfate takes place is materially lower. The best temperature to be used in the treatment of each metal sulfate will vary with the kind of ore and with the kind of reducing agent used. For instance, if a barium sulfate ore contains impurities, such as iron and silicates, the temperature must not go too high or losses due to the formation of insoluble ferrites and silicates or barium will result. The temperature for reduction is higher when hard burning coke is used as the reducing agent than it is when gas coal is used.

The amount of fuel required, that is, the proportion of fuel to metal sulfate will vary with the kind of fuel used and to some extent with the method of supplying the fuel. The process is most efficient with regard to fuel consumption and yield of sulphide when a part of the fuel, preferably an amount in excess of that chemically equivalent to the sulfate treated is supplied to the reaction chamber in admixture with the sulfate.

In the manufacture of barium sulphide from barytes good results are obtained if the pulverized barytes are mixed with from 20 to 30 per cent of powdered coal and blown into the reaction chamber through burner K while sufficient fuel is supplied to burner H to maintain reducing conditions with a bright red heat within the reaction chamber.

Our process is carried out in simple apparatus and since the reaction takes place rapidly large quantities of sulphide are produced in comparatively small apparatus. The yield of barium sulphide is higher and the heat utilization better than in any process now in use.

We claim—

1. Process of making metal sulphide which comprises suspending a metal sulfate in a finely divided condition in a reducing atmosphere at high temperature.

2. Process of making metal sulphide which comprises grinding a metal sulfate to a size capable of passing a screen of at least 200 mesh, and suspending said metal sulfate in a strongly reducing atmosphere at a bright red heat.

3. Process of making metal sulphide which comprises blowing finely divided metal sulfate and carbonaceous fuel into a reaction chamber, and burning said fuel in the reaction chamber in the presence of said metal sulfate.

4. Process of making metal sulphide which comprises mixing finely divided metal sulfate with carbonaceous fuel, blowing the mixture into a reaction chamber in the presence of air in quantity sufficient to burn said fuel and produce a reducing atmosphere at a bright red heat.

5. Process of making alkali and alkaline earth metal sulphides which comprises grinding one of the sulfates of the alkali and alkaline earth metals to a size capable of passing a screen of at least 200 mesh, and suspending said metal sulfate in a reducing atmosphere at high temperature.

6. Process of making barium sulphide which comprises suspending finely divided barytes in a reducing atmosphere at a bright red heat.

7. Process of making barium sulphide which comprises mixing finely divided barytes with finely divided carbonaceous fuel, suspending said mixture in a gas, and igniting the suspended fuel.

8. Process of making barium sulphide which comprises suspending finely divided barytes in a reducing gas at high temperature, cooling the gas and scrubbing the same with water, whereby a solution of barium sulphide is formed.

9. Process of making barium sulphide which comprises mixing barytes pulverized to a size capable of passing a screen of at least 200 mesh with 20 to 30 per cent of its weight of powdered coal, suspending said mixture in the flame produced by burning carbonaceous fuel in a reaction chamber, cooling the resulting gaseous products of combustion and scrubbing the cooled gases with an aqueous liquid.

10. Process of making metal sulphide which comprises producing a down-flowing stream of reducing gas at a bright red heat, suspending finely divided metal sudfate in said gas stream, cooling the gases, and separating metal sulphide from the gases.

11. Process of making metal sulphide which comprises, producing a stream of reducing gas at a bright red heat, and suspending finely divided metal sulfate in said gas stream.

12. Process of making metal sulphide which comprises mixing pulverized metal sulfate with carbonaceous fuel in quantity sufficient when burned to produce a strongly reducing atmosphere at a bright red heat, blowing said mixture into a combustion chamber, and burning said fuel.

In testimony whereof, we affix our signatures.

HENRY HOWARD.
EARL BURNARD ALVORD.